(12) United States Patent
Wirkowski et al.

(10) Patent No.: US 9,316,478 B2
(45) Date of Patent: Apr. 19, 2016

(54) METHOD AND DEVICE FOR DETECTING WHEN A CLOSING POINT OF A HYDRAULIC VALVE HAS BEEN REACHED

(75) Inventors: Michael Wirkowski, Regensburg (DE); Hans Riepl, Hemau (DE); Björn von Willmann, Regensburg (DE); Thomas Kraft, Obertraubling (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 681 days.

(21) Appl. No.: 13/819,028

(22) PCT Filed: Aug. 22, 2011

(86) PCT No.: PCT/EP2011/064361
§ 371 (c)(1),
(2), (4) Date: May 8, 2013

(87) PCT Pub. No.: WO2012/025479
PCT Pub. Date: Mar. 1, 2012

(65) Prior Publication Data
US 2013/0226488 A1    Aug. 29, 2013

(30) Foreign Application Priority Data
Aug. 26, 2010   (DE) .......................... 10 2010 039 832

(51) Int. Cl.
*G06F 19/00* (2011.01)
*G01B 7/14* (2006.01)
(Continued)

(52) U.S. Cl.
CPC *G01B 7/14* (2013.01); *F02D 41/20* (2013.01); *F02M 59/466* (2013.01);
(Continued)

(58) Field of Classification Search
CPC .............. G07D 7/12; G07D 7/20; B07C 5/10
See application file for complete search history.

(56) References Cited

U.S. PATENT DOCUMENTS

| 8,402,952 B2 | 3/2013 | Haaf et al. ..................... 123/499 |
| 2003/0000765 A1* | 1/2003 | Spadafora ..................... 180/422 |

(Continued)

FOREIGN PATENT DOCUMENTS

| DE | 102007035316 A1 | 1/2009 | .............. F02D 41/20 |
| EP | 0563760 A2 | 10/1993 | .............. F02D 41/00 |

(Continued)

OTHER PUBLICATIONS

International Search Report and Written Opinion, Application No. PCT/EP2011/064361, 13 pages, Nov. 9, 2011.

*Primary Examiner* — Edward Raymond
(74) *Attorney, Agent, or Firm* — Slayden Grubert Beard PLLC

(57) ABSTRACT

A method and device are provided for detecting when a closing point of a hydraulic valve has been reached. The valve has a closing element operated by an electric actuator. A predetermined voltage for closing the valve is applied to the actuator. A profile of a current flowing through the actuator is detected. Based on a first increase in the profile corresponding to the valve being at least partially open, a subsequent decrease in the profile corresponding to the closing element carrying out a movement to close the valve, and a second increase in the profile following said decrease in the profile, a local minimum of the detected current is determined between the decrease and the second increase in the profile. Depending on the local minimum of the detected current, a closing point is then determined which corresponds to a time point of the local minimum of the detected current.

10 Claims, 1 Drawing Sheet

(51) Int. Cl.
*F02M 59/46* (2006.01)
*F02M 65/00* (2006.01)
*F16K 37/00* (2006.01)
*F02D 41/20* (2006.01)
*F02D 41/38* (2006.01)

(52) U.S. Cl.
CPC ......... *F02M 65/005* (2013.01); *F16K 37/0041* (2013.01); *F02D 41/3845* (2013.01); *F02D 2041/2055* (2013.01); *F02D 2041/2058* (2013.01)

(56) References Cited

U.S. PATENT DOCUMENTS

| | | | |
|---|---|---|---|
| 2005/0066940 A1 | 3/2005 | Sheikh et al. | 123/446 |
| 2013/0226488 A1 | 8/2013 | Wirkowski et al. | 702/64 |

FOREIGN PATENT DOCUMENTS

| | | | |
|---|---|---|---|
| GB | 2377025 A | 12/2002 | F01L 9/04 |
| JP | 5272390 A | 10/1993 | F02D 41/20 |

* cited by examiner

METHOD AND DEVICE FOR DETECTING WHEN A CLOSING POINT OF A HYDRAULIC VALVE HAS BEEN REACHED

CROSS-REFERENCE TO RELATED APPLICATIONS

This application is a U.S. National Stage Application of International Application No. PCT/EP2011/064361 filed Aug. 22, 2011, which designates the United States of America, and claims priority to DE Application No. 10 2010 039 832.2 filed Aug. 26, 2010, the contents of which are hereby incorporated by reference in their entirety.

TECHNICAL FIELD

This disclosure relates to a method and a device for detecting when a closing point of a hydraulic valve has been reached.

BACKGROUND

Hydraulic valves are used, in particular, in high pressure pumps for delivering fuel in injection system for internal combustion engines of motor vehicles.

Such valves are subject to high stresses, in particular if they are subject to continuous loading as can be the case in high pressure pumps. Since high pressure pumps are subject to pressures of, for example, 2000 bar or more, stringent requirements are made of the valves in such pumps.

SUMMARY

One embodiment provides a method for detecting when a closing point of a hydraulic valve has been reached, wherein the valve has a closing body which can be activated by an electric actuator in order to close the valve, having the steps: application of a voltage, predefined for the closing of the valve, to the actuator; detecting a profile of a current flowing through the actuator; starting from a first rise in the profile of the detected current which is representative of the fact that the valve is at least partially opened, a subsequent fall in the profile of the detected current which is representative of the fact that the closing body carries out a movement in order to close the valve, and a second rise in the profile of the detected current subsequent to the fall in the profile of the detected current, determining a local minimum of the detected current between the fall and the second rise in the profile of the detected current; and determining a closing point corresponding to a time of the local minimum of the detected current, as a function of the local minimum of the detected current.

Another embodiment provides a device for detecting when a closing point of a hydraulic valve has been reached, wherein the valve has a closing body which can be activated by an electric actuator in order to close the valve, wherein the device is designed for: application of a voltage, predefined for the closing of the valve, to the actuator; detecting a profile of a current flowing through the actuator; starting from a first rise in the profile of the detected current which is representative of the fact that the valve is at least partially opened, a subsequent fall in the profile of the detected current which is representative of the fact that the closing body carries out a movement in order to close the valve, and a second rise in the profile of the detected current subsequent to the fall in the profile of the detected current, determining a local minimum of the detected current between the fall and the second rise in the profile of the detected current; and determining a closing point corresponding to a time of the local minimum of the detected current, as a function of the local minimum of the detected current.

BRIEF DESCRIPTION OF THE DRAWINGS

Example embodiments are explained in more detail below with reference to the drawings, in which.

DETAILED DESCRIPTION

Embodiments of the present disclosure provide a method and a device for detecting when a closing point of a hydraulic valve has been reached, with which precise and cost-effective operation of the valve is made possible.

Some embodiments provide a method and a corresponding device for detecting when a closing point of a hydraulic valve has been reached, wherein the valve has a closing body which can be activated by an electric actuator in order to close the valve. A voltage, predefined for the closing of the valve, is applied to the actuator. A profile of a current flowing through the actuator is detected. Starting from a first rise in the profile of the detected current which is representative of the fact that the valve is at least partially opened, a subsequent fall in the profile of the detected current which is representative of the fact that the closing body carries out a movement in order to close the valve, and a second rise in the profile of the detected current subsequent to the fall in the profile of the detected current, a local minimum of the detected current is determined between the fall and the second rise in the profile of the detected current. A closing point corresponding to a time of the local minimum of the detected current is determined, as a function of the local minimum of the detected current.

The time of the local minimum of the detected current is representative of the fact that the valve is currently closed.

Certain embodiments are based on the realization that during a movement of the closing body energy is extracted from the actuator and the current drops until the closing body comes to rest again when the closing point of the valve has been reached. One possible advantage is that the closing point of the valve can be determined very precisely. External influences such as, for example, the pressure and the temperature of a medium flowing through the valve can be compensated. As a result, high precision of a rate of throughput of fluid through the valve can be achieved and fluctuations in the fluid throughput rate can be kept small.

Figure 1:
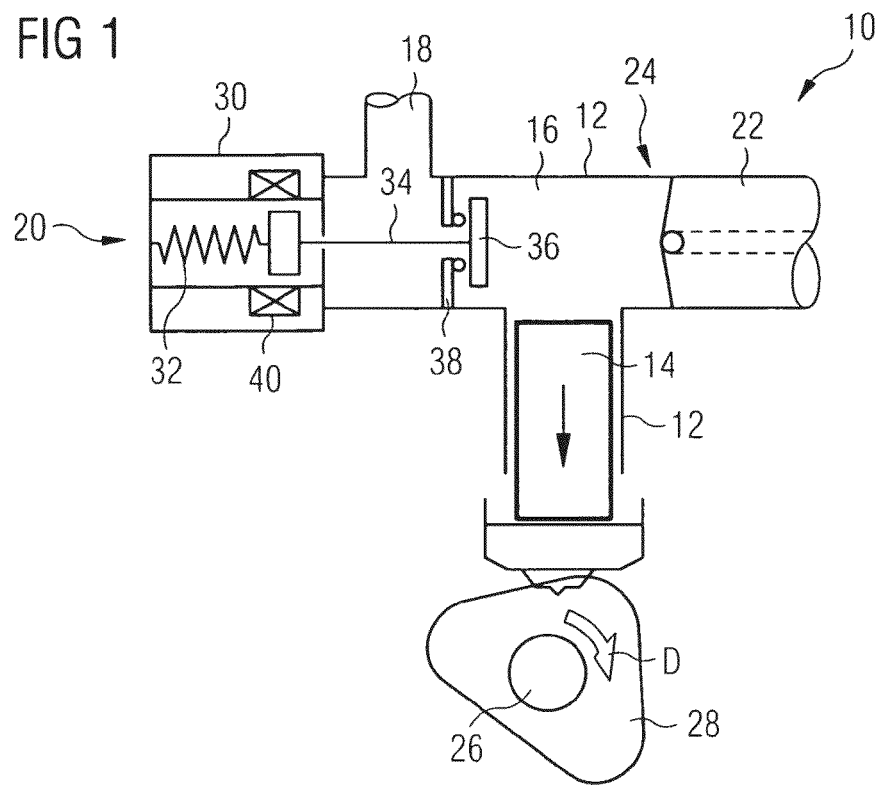
FIG. 1 shows a schematic view of an example pump having a valve in a longitudinal section.

FIG. 1 shows a pump 10 having a pump housing 12. The pump 10 is embodied, in particular, as a high pressure pump, e.g., as a radial piston pump. A pump piston 14 is movably mounted in the pump housing 12. A pressure space 16 is located in the pump housing 12, at one end of the pump piston 14. In order to be able to fill the pressure space 16 with fluid, the latter has an inflow line 18 in which a valve 20 which is embodied as an inlet valve may be arranged. The valve 20 which is embodied as an inlet valve may be embodied as a digitally switched valve. The valve 20 facilitates the filling of the pressure space 16 and prevents the fluid from flowing back out of the inflow line 18 during filling. The pressure space 16 also has a discharge line 22 in which a further valve 24 which is embodied as an outlet valve is arranged. As a result, fluid can be expelled from the pressure space 16.

The pump 10 also has a drive shaft 26 which is operatively connected to an eccentric ring 28 and can be rotated in the clockwise direction in a rotational direction D. Instead of the eccentric ring 28, a camshaft can also be used.

Alternatively, the pump 10 can also be embodied as a crank drive pump.

The valve 20 has a valve housing 30 with a recess. A spring 32, a closing body 34 and a sealing element 36 are arranged in the valve housing 30. The spring 32 prestresses the sealing element 36 by means of the closing body 34 by virtue of the fact that said spring 32 is supported on a wall of the recess of the valve housing 30. The valve 20 also has a sealing seat 38 which is fixedly arranged with respect to the valve housing 30.

The valve 20 also has an actuator 40. The actuator 40 has, in particular, a solenoid. The closing body 34 can be activated by the actuator 40.

In the text which follows, the method of functioning of the pump 10 and of the valve 20 are to be described:

By means of a rotational movement of the drive shaft 26 in the rotational direction D, the pump piston 14 is moved toward the drive shaft 26 by means of the eccentric ring 28 until said pump piston 14 reaches a bottom dead center. In the process, the valve 20 opens owing to the spring force of the spring 32 and a pressure difference upstream and downstream of the valve 20. The sealing element 36 lifts off from the sealing seat 38. The pressure space 16 is then filled with fluid. As a result of a further rotational movement of the drive shaft 26 in the rotational direction D, the pump piston 14 is moved away from the drive shaft 26 by the eccentric ring 28 and in the process compresses the fluid located in the pressure space 16. At a predefined time, a predefined voltage $U\_1$ is applied to the actuator 40 (see profile of a voltage U in FIG. 2). As a result of the application of the predefined voltage $U\_1$, an actuator force which counteracts the spring force can act on the closing body 34. As a result of the movement of the closing body 34 in the direction of the actuator force and the prevailing pressure conditions upstream and downstream of the valve 20, the sealing element 36 can come to bear against the sealing seat 38. The valve 20 is then closed hydraulically and a flow of fluid through the valve 20 is prohibited. The fluid compressed into the pressure space 16 can then be expelled completely from the pump 10 via the further valve 24 which is formed as a discharge valve. The pump piston 14 then has reached a top dead center.

If the pump 10 is a fuel high pressure pump of an injection system of an internal combustion engine, the fuel to which high pressure is applied can arrive at a fluid accumulator embodied as a high pressure fuel accumulator, referred to as the common rail.

Figure 2:
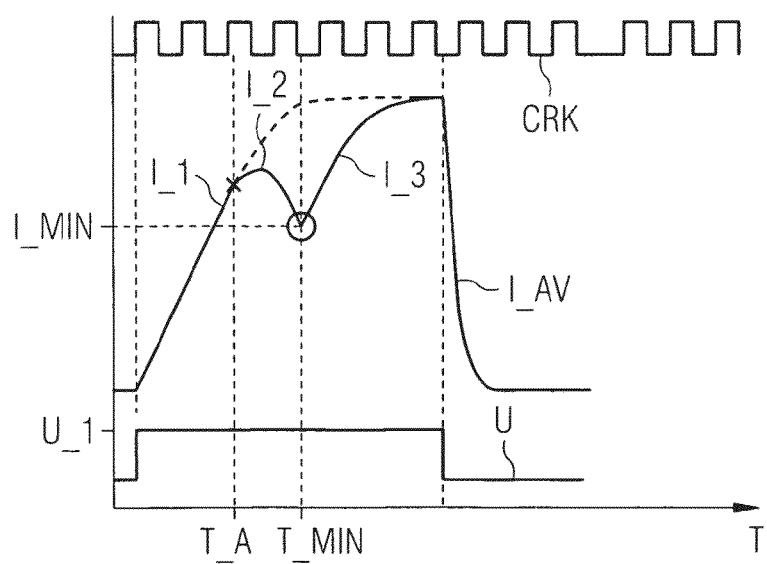
FIG. 2 shows a schematic view of an example voltage and current profile of the valve.

In the text which follows, the detection of when a closing point of the valve 20 is reached will be presented in detail, in particular with reference to FIG. 2:

At first, the predefined voltage $U\_1$ is applied to the actuator 40. The predefined voltage $U\_1$ permits the valve 20 to close. A profile of a current flowing through the actuator 40 is detected. Measured values $I\_AV$ of the current flowing through the actuator 40 may be detected.

In a first section $I\_1$ of the profile of the measured values $I\_AV$ of the current the current rises. The rise is primarily dependent on the predefined voltage $U\_1$ and an electrical resistance of the actuator 40. The electrical resistance of the actuator 40 is determined by an ohmic part and an inductive part. As soon as the closing body 34 begins a movement at a time $T\_A$, the profile of the measured values $I\_AV$ of the current follows a parabolic shape and ultimately drops here again in a second section 12 of the profile of the measured values $I\_AV$ of the current. The second section $I\_2$ of the profile of the measured values $I\_AV$ of the current represents a movement of the closing body 34 to close the valve 20. The movement of the closing body 34 lasts until the sealing element 36 has impacted against the sealing seat 38 (FIG. 1). In a third section $I\_3$ of the profile of the measured values $I\_AV$ of the current, a second rise in the current takes place. Between the fall and the second rise in the profile of the measured values $I\_AV$ of the current, a local minimum $I\_MIN$ of the current is reached at a time $T\_MIN$. The closing body 34 comes to a standstill, in particular at the time $T\_MIN$. The time T-MIN is representative of the fact that the valve 20 is currently closed. The rise in the current in the third section $I\_3$ results from the fact that after the closing body 34 has come to a standstill, no further energy for the movement of the actuator 40 is drawn from the magnetic field thereof.

The determination of the measured values $I\_AV$ of the current flowing through the actuator 40 may be effected by sampling the current in discrete time steps in such a way that the measured values $I\_AV$ at the current flowing through the actuator 40 are spaced apart from one another in such a way that they permit a predefined precision level during the determination of the closing point of the hydraulic valve 20. The time $T\_MIN$ of the local minimum $I\_MIN$ of the current may be determined by determining the profile of the current gradients of the profile of the measured values $I\_AV$ of the current and using this profile to determine the time $T\_MIN$ of the local minimum $I\_MIN$ of the current. The time $T\_MIN$ which is determined in this way can then be stored in a suitable way.

The detected time $T\_MIN$ of the standstill of the closing body may be assigned to a crankshaft angle of the pump 10 (illustrated here by a crankshaft signal CRK, FIG. 2) and stored together with the latter. As a result, a high level of accuracy of the closing point of the valve 20 can be achieved in a simple way in conjunction with the crankshaft angle of the pump 10.

As a result, a particularly high level of robustness with respect to faults and fluctuations in the high pressure range of the pump 10 can be achieved. The precise detection of the closing point of the valve 20 enables the expenditure on the determination of the characteristic diagrams for the correction of faults of the closing time of the valve 20 to be kept low. The throughput rate of the pump 10 can be kept constant in a very precise way. If the pump 10 is a fuel high pressure pump of an injection system of an internal combustion engine, the pressure in the common rail connected downstream can be kept very constant. As a result, the accuracy of the injection quantity of injection valves which are connected downstream of the common rail can also be very high. This permits very strict requirements on the emission of internal combustion engines to be met.

What is claimed is:

1. A method for detecting when a closing point of a hydraulic valve has been reached, wherein the valve has a closing body which can be activated by an electric actuator in order to close the valve, the method comprising:
applying a voltage to the actuator, the voltage being predefined for closing the valve,
detecting a profile of a current flowing through the actuator during a closing process of the valve, the profile of the detected current including a first rise corresponding to the valve being at least partially opened, a subsequent fall of the detected current corresponding to a closing movement of the closing body, and a second rise of the detected current subsequent to the fall of the detected current, determining a local minimum of the detected current between the fall and the second rise in the profile of the detected current, and determining a closing point corresponding to a time of the local minimum of the detected current, based on the determined local minimum of the detected current.

2. The method of claim 1, wherein the first rise and the fall of the detected current follow a parabolic path.

3. The method of claim 1, wherein the second rise of the detected current corresponds to a time period after the valve has closed.

4. The method of claim 1, wherein the second rise of the detected current has a greater peak than the first rise of the detected current.

5. The method of claim 1, wherein determining the local minimum of the detected current between the fall and the second rise in the profile of the detected current comprises:

detecting a plurality of current values at a plurality of discrete times during the closing process of the valve, calculating a plurality of current gradients of the current profile based on the plurality of detected current values, and determining the local minimum of the detected current based on the calculated current gradients.

6. A device for detecting when a closing point of a hydraulic valve has been reached, wherein the valve has a closing body which can be activated by an electric actuator in order to close the valve, the device including:

electronics configured to:

apply a voltage to the actuator, the voltage being predefined for closing the valve, detect a profile of a current flowing through the actuator during a closing process of the valve, the profile including a first rise of the detected current corresponding to the valve being at least partially opened, a subsequent fall of the detected current corresponding to a closing movement of the closing body, and a second rise of the detected current subsequent to the fall of the detected current, determine a local minimum of the detected current between the fall and the second rise in the profile of the detected current, and determine a closing point corresponding to a time of the local minimum of the detected current, based on the determined local minimum of the detected current.

7. device of claim 6, wherein the first rise and the fall of the detected current follow a parabolic path.

8. The device of claim 6, wherein the second rise of the detected current corresponds to a time period after the valve has closed.

9. The device of claim 6, wherein the second rise of the detected current has a greater peak than the first rise of the detected current.

10. The device of claim 6, wherein determining the local minimum of the detected current between the fall and the second rise in the profile of the detected current comprises:

detecting a plurality of current values at a plurality of discrete times during the closing process of the valve, calculating a plurality of current gradients of the current profile based on the plurality of detected current values, and determining the local minimum of the detected current based on the calculated current gradients.

* * * * *